(12) United States Patent
Hsu et al.

(10) Patent No.: US 7,581,009 B1
(45) Date of Patent: *Aug. 25, 2009

(54) GLOBAL SERVER LOAD BALANCING

(75) Inventors: Ivy Pei-Shan Hsu, Pleasanton, CA (US); David Chun-Ying Cheung, Cupertino, CA (US); Rajkumar Ramniranjan Jalan, Saratoga, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/741,480

(22) Filed: Apr. 27, 2007

Related U.S. Application Data

(63) Continuation of application No. 09/670,487, filed on Sep. 26, 2000, now Pat. No. 7,454,500.

(51) Int. Cl.
*G06F 15/173* (2006.01)

(52) U.S. Cl. .................................................... 709/226

(58) Field of Classification Search ......... 709/223–224, 709/226, 241, 201, 203
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,948,061 A | 9/1999 | Merriman et al. | |
| 5,951,634 A | 9/1999 | Sitbon et al. | |
| 6,006,269 A | 12/1999 | Phaal | |
| 6,006,333 A | 12/1999 | Nielsen | |
| 6,092,178 A * | 7/2000 | Jindal et al. | 712/27 |
| 6,112,239 A | 8/2000 | Kenner et al. | |
| 6,115,752 A | 9/2000 | Chauhan | |
| 6,119,143 A | 9/2000 | Dias et al. | |
| 6,128,279 A | 10/2000 | O'Neil et al. | |
| 6,128,642 A | 10/2000 | Doraswamy et al. | |
| 6,148,410 A | 11/2000 | Baskey et al. | |
| 6,167,445 A | 12/2000 | Gai et al. | |
| 6,167,446 A | 12/2000 | Lister et al. | |
| 6,182,139 B1 | 1/2001 | Brendel | |
| 6,195,691 B1 | 2/2001 | Brown | |
| 6,233,604 B1 | 5/2001 | Van Horne et al. | |
| 6,286,039 B1 | 9/2001 | Van Horne et al. | |
| 6,286,047 B1 | 9/2001 | Ramanathan et al. | |

(Continued)

OTHER PUBLICATIONS

U.S. Appl. No. 11/429,177 (Continuation of U.S. Patent 7,086,061 cited above), filed May 5, 2006, Joshi et al.

(Continued)

*Primary Examiner*—Salad Abdullahi
(74) *Attorney, Agent, or Firm*—Townsend and Townsend and Crew LLP

(57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

28 Claims, 3 Drawing Sheets

U.S. PATENT DOCUMENTS

| | | | |
|---|---|---|---|
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,405,252 B1 | 6/2002 | Gupta et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,487,555 B1 | 11/2002 | Bharat et al. |
| 6,490,624 B1 | 12/2002 | Sampson et al. |
| 6,549,944 B1 | 4/2003 | Weinberg et al. |
| 6,578,066 B1 * | 6/2003 | Logan et al. ............... 718/105 |
| 6,578,077 B1 | 6/2003 | Rakoshitz et al. |
| 6,606,643 B1 | 8/2003 | Emens et al. |
| 6,611,861 B1 | 8/2003 | Schairer |
| 6,665,702 B1 | 12/2003 | Zisapel et al. |
| 6,681,232 B1 | 1/2004 | Sistanizadeh et al. |
| 6,681,323 B1 | 1/2004 | Fontanesi et al. |
| 6,691,165 B1 | 2/2004 | Bruck et al. |
| 6,725,253 B1 | 4/2004 | Okano et al. |
| 6,745,241 B1 | 6/2004 | French et al. |
| 6,754,699 B2 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,826,198 B2 | 11/2004 | Turina et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,081 B1 | 5/2005 | Ludwig |
| 6,928,485 B1 | 8/2005 | Krishnamurthy et al. |
| 6,963,914 B1 | 11/2005 | Breibart et al. |
| 6,963,917 B1 | 11/2005 | Callis et al. |
| 6,985,956 B2 | 1/2006 | Luke et al. |
| 6,987,763 B2 * | 1/2006 | Rochberger et al. ......... 370/389 |
| 6,996,615 B1 | 2/2006 | McGuire |
| 6,996,616 B1 | 2/2006 | Leighton et al. |
| 7,000,007 B1 | 2/2006 | Valenti |
| 7,020,698 B2 * | 3/2006 | Andrews et al. ............ 709/223 |
| 7,020,714 B2 | 3/2006 | Kalyanaraman et al. |
| 7,028,083 B2 | 4/2006 | Levine et al. |
| 7,032,010 B1 * | 4/2006 | Swildens et al. ............ 709/219 |
| 7,036,039 B2 | 4/2006 | Holland |
| 7,058,717 B2 | 6/2006 | Chao et al. |
| 7,062,642 B1 | 6/2006 | Langrind et al. |
| 7,082,102 B1 | 7/2006 | Wright |
| 7,086,061 B1 | 8/2006 | Joshi et al. |
| 7,089,293 B2 | 8/2006 | Grosner et al. |
| 7,114,008 B2 | 9/2006 | Jungck et al. |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,185,052 B2 | 2/2007 | Day |
| 7,197,547 B1 | 3/2007 | Miller et al. |
| 7,206,806 B2 | 4/2007 | Pineau |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,277,954 B1 | 10/2007 | Stewart et al. |
| 7,296,088 B1 | 11/2007 | Padmanabhan et al. |
| 7,321,926 B1 | 1/2008 | Zhang et al. |
| 7,330,908 B2 | 2/2008 | Jungck |
| 7,383,288 B2 | 6/2008 | Miloushev et al. |
| 7,423,977 B1 | 9/2008 | Joshi |
| 7,454,500 B1 | 11/2008 | Hsu |
| 2001/0049741 A1 | 12/2001 | Skene et al. |
| 2001/0052016 A1 | 12/2001 | Skene et al. |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0087722 A1 | 7/2002 | Datta et al. |
| 2002/0091840 A1 | 7/2002 | Pulier et al. |
| 2002/0112036 A1 | 8/2002 | Bohannon et al. |
| 2002/0120743 A1 | 8/2002 | Shabtay et al. |
| 2002/0120763 A1 | 8/2002 | Miloushev |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0018796 A1 | 1/2003 | Chou et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 * | 4/2003 | Swildens et al. ............ 709/224 |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0154239 A1 | 8/2003 | Davis et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0039847 A1 | 2/2004 | Persson |
| 2004/0064577 A1 | 4/2004 | Dahlin et al. |
| 2004/0194102 A1 | 9/2004 | Neerdaels |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0286416 A1 | 12/2005 | Shimonishi et al. |
| 2006/0020715 A1 | 1/2006 | Jungck |
| 2006/0036743 A1 | 2/2006 | Deng et al. |

OTHER PUBLICATIONS

Albitz, P., et al., "DNS and BIND in a Nutshell," O'Reilly & Associates, Sebastopol, CA, 1992, pp. 214-215.

Alteon WebSystems Inc., "Enhancing Web User Experience With Global Server Load Balancing," White Paper, Title Page and pp. 1-7, Jun. 1999, downloaded from Internet at http://www.alteon.com.

AlteonWebSystems, "PCD White Paper," *AlteonWebSystems*, pp. 1-8, Mar. 2001.

Alteon WebSystems Inc., Alteon WebSystems Introduces New Layer 4—Switching Technology That Speeds User Access to Internet Servers, pp. 1-4, Dec. 7, 1998, downloaded from the internet at http:web.archive.org/web/20000919190409/www.alteonwebsystems.com/press/releases/1998/120798.asp.

Bestavros, Azer, "WWW Traffic Reduction and Load Balancing Through Server-Based Caching," IEEE Concurrency, Jan.-Mar. 1997, pp. 56-67.

Cardellini, et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova et al., "Challenges in URL Switching for Implementing Globally Distributed Web Sites," *IEEE*, pp. 89-94, 2000.

Genova et al., "Challenges to URL Switching for Implementing Globally Distributed Web Sites," Department of Computing Science and Engineering, University of South Florida, pp. 1-9, Aug. 11, 2000 (PowerPoint Presentation).

International Business Machines Corporation, "SecureWay Network Dispatcher User's Guide, Version 2.1 for AIX, Solaris and Windows NT," Third Edition Mar. 1999, Chapter 3, "Introducing IBM's SecureWay Network Dispatcher," (pp. 15-28), Chapter 4, "Planning for the Dispatcher Component," (pp. 29-36), Chapter 9, "Planning for Interactive Session Support Component," (pp. 85-94), Chapater 10, "Configuring the Interactive Session Support Component," (pp. 95-108), Chapter 11, Operating and Managing SecureWay Network Dispatcher, (pp. 109-120), Appendix C, "Command References for ISS", (pp. 163-176), Appendix E, "Sample Configuration Files," (pp. 179-196), downloaded from the Internet at http://www-3.ibm.com/software/webservers/edgeserver/library.html.

International Business Machines Corporation, "IBM WebSphere Performance Pack: Load Balancing with IBM SecureWay Network Dispatcher," Oct. 1999, First edition, Chapter 1, "IBM WebSphere Performance Pack Concepts," (pp. 3-26), Chapter 2, "IBM SecureWay Network Dispatcher Concepts," (pp. 27-54), Chapter 4, "ND Basic Scenarios," (pp. 81-192), Chapter 8, "Wide Area Network Dispatcher Support," (pp. 211-242), downloaded from the Internet at http://www-3.ibm.com/software/webservers/edgeserver/library.html.

Krapf. E., "Alteons's Global Server Load Balancing," *Business Communications Review*, downloaded from the internet, pp. 60, Jan. 1999, downloaded at http://www.bcr.com/bcrmag/1999/01/p60.asp.

Norton Networks, "Alteon Personal Content Director," © 2001, can be retrieved from http://www.nortelnetworks.com/personalinternet, 4 pages.

Office Action dated Jan. 12, 2006 received in related U.S. Appl. No. 10/305,823, filed Nov. 27, 2002, 16 pages.

Office Action dated Mar. 9, 2006 received in related U.S. Appl. No. 10/206,580, filed Jul. 25, 2002, 12 pages.

Paul, Arindam et al., "Balancing Web Server Load for Adaptable Video Distribution," IEEE, 2000, pp. 469-476.

U.S. Appl. No. 10/206,580, filed Jul. 25, 2002, entitled "Global Server Load Balancing."

U.S. Appl. No. 10/305,823, filed Nov. 27, 2002, entitled "Distributed Health Check for Global Server Load Balancing."

U.S. Appl. No. 10/376,903, filed Feb. 28, 2003, entitled "Global Server Load Balancing."

U.S. Appl. No. 10/211,822, filed Aug. 1, 2002, entitled "Statistical Tracking for Global Server Load Balancing."

U.S. Appl. No. 10/377,364, filed Feb. 28, 2003, entitled "Method and System to Clear Counters Used for Statistical Tracking for Global Server Load Balancing."

U.S. Appl. No. 10/214,921, filed Aug. 7, 2002, entitled "Canonical Name (Cname) Handling for Global Server Load Balancing."

U.S. Appl. No. 10/674,627, filed Sep. 29, 2003, entitled "Global Server Load Balancing Support for Private VIP Addresses."

U.S. Appl. No. 10/839,919, filed May 6, 2004, entitled "Host-Level Policies for Global Server Load Balancing."

U.S. Appl. No. 10/840,496, filed May 6, 2004, entitled "Configurable Geographic Prefixes for Global Server Load Balancing."

U.S. Appl. No. 10/924,552, filed Aug. 23, 2004, entitled "Smoothing Algorithm for Round Trip Time (RTT) Measurements."

Yerxa, G., "ACElerate on Fast Track for Load-Balancing," *Network Computing Magazine*, pp. 1-4, Mar. 8, 1999 downloaded from internet at http://www.networkcomputing.com/1005/1005sp2.html.

U.S. Appl. No. 11/707,697, filed Feb. 16, 2007, Kommula et al.

Nortel Networks, "Alteon Personal Content Director," © 2001, can be retrieved from http://www.nortelnetworks.com/personalinternet, 4 pages [previously cited as Norton Networks, "Alteon Personal Content Director," © 2001, can be retrieved from http://www.nortelnetworks,com/personalinternet, 4 pages—Reference No. DB in Information Disclosure Statement filed on Apr. 27, 2007].

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002 (19 pages).

"Configuring the CSS Domain Name Service," Dec. 2000, Cisco Systems Inc., downloaded from http://www.ciscosystems.com (13 pages).

Doeringer et al., "Routing on Longest-Matching Prefixes," IEEE/ACM Transactions on Networking, vol. 4, No. 1, Feb. 1996 (12 pages).

Office Action dated Dec. 31, 2003 received in related U.S. Appl. No. 09/670,487, filed Sep. 26, 2000 (24 pages).

Office Action dated Sep. 21, 2004 received in related U.S. Appl. No. 09/670,487, filed Sep. 26, 2000 (22 pages).

Office Action dated Mar. 15, 2005 received in related U.S. Appl. No. 09/670,487, filed Sep. 26, 2000 (18 pages).

Office Action dated Nov. 3, 2005 received in related U.S. Appl. No. 09/670,487, filed Sep. 26, 2000 (18 pages).

Office Action dated May 3, 2006 received in related U.S. Appl. No. 09/670,487, filed Sep. 26, 2000 (21 pages).

Office Action dated Nov. 17, 2006 received in related U.S. Appl. No. 09/670,487, filed Sep. 26, 2000 (11 pages).

Office Action dated Oct. 30, 2007 received in related U.S. Appl. No. 09/670,487, filed Sep. 26, 2000 (14 pages).

Office Action dated Jul. 22, 2008 received in related U.S. Appl. No. 09/670,487, filed Sep. 26, 2000 (11 pages).

U.S. Appl. No. 12/177,021, filed Jul. 21, 2008, Joshi, Prajakta.

U.S. Appl. No. 12/272,618 (Which is a Continuation of U.S. Patent No. 7,454,500), filed Nov. 17, 2008, Hsu, Ivy Pei-Shan.

U.S. Non-Final Office Action for U.S. Appl. No. 11/707,697, Dated Mar. 3, 2009.

* cited by examiner

GLOBAL SERVER LOAD BALANCING

CROSS-REFERENCES TO RELATED APPLICATIONS

The present application is a continuation of U.S. application Ser. No. 09/670,487 filed Sep. 26, 2000, now U.S. Pat. No. 7,454,500, issued Nov. 18, 2008 and titled Global Server Load Balancing, the entire contents of which are herein incorporated by reference for all purposes.

BACKGROUND OF THE INVENTION

1. Field of the Invention

The present invention relates to load balancing among servers. More particularly, the present invention relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (i.e. foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

BRIEF SUMMARY OF THE INVENTION

The present invention provides an improved method and system for serving IP addresses to a client, based on a selected set of performance metrics. In accordance with this invention, a global server load-balancing (GSLB) switch is provided as a proxy for an authoritative DNS server, together with one or more site switches each associated with one or more host servers. Both the GSLB switch and the site switch can be implemented using the same type of switch hardware. Each site switch provides the GSLB switch with current site-specific information regarding the host servers associated with the site switch. Under the present invention, when an authoritative DNS server resolves a host name in a query and returns one or more IP addresses, the GSLB switch filters the IP addresses using the performance metrics compiled from the site-specific information collected from the site switches. The GSLB switch then returns a ranked or weighted list of IP addresses to the inquirer. In one embodiment, the IP address that is estimated to provide the best expected performance for the client is placed at the top of the list. Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metrics is the site switch's "flashback" speed (i.e., how quickly a switch receives a health check result). The ordered list can also be governed by other policies, such as the least selected host server.

The present invention is better understood upon consideration of the detailed description of the preferred embodiments below, in conjunction with the accompanying drawings.

DETAILED DESCRIPTION OF THE INVENTION

Figure 1:
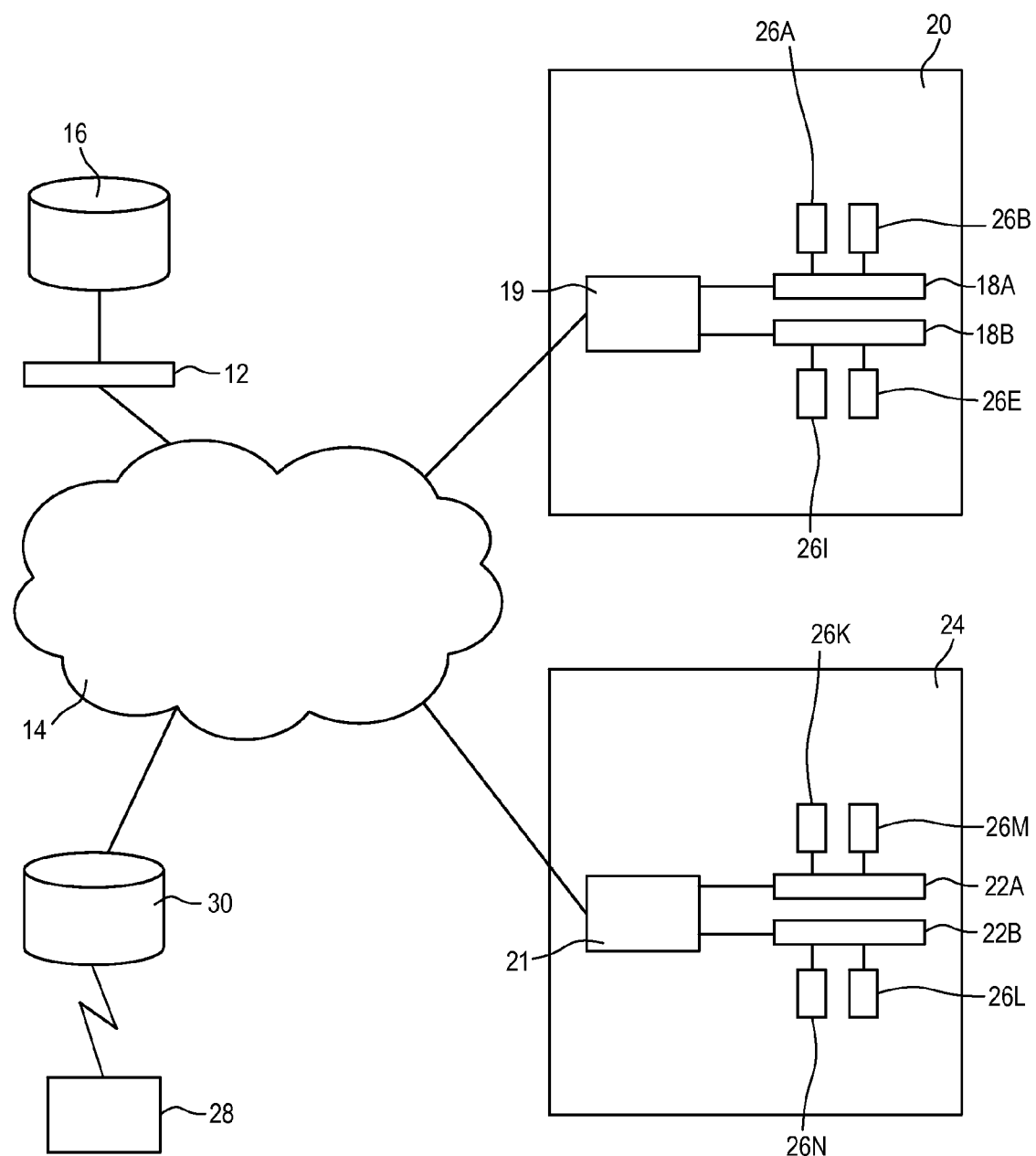
FIG. 1 illustrates a global server load balancing configuration.

FIG. 1 illustrates one embodiment of the present invention that provides a global server load balancing configuration. As shown in FIG. 1, global server load balancing (GSLB) switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS sever of the domain "foundrynet.com" is a virtual IP address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, ..., 26I, ... 26N. Some or all of servers 26A, ..., 26I, ..., 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www-.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses are ordered by GSLB switch 12 based on performance metrics described in further detail below. In the remainder of this detailed description, for the purpose of illustrating the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
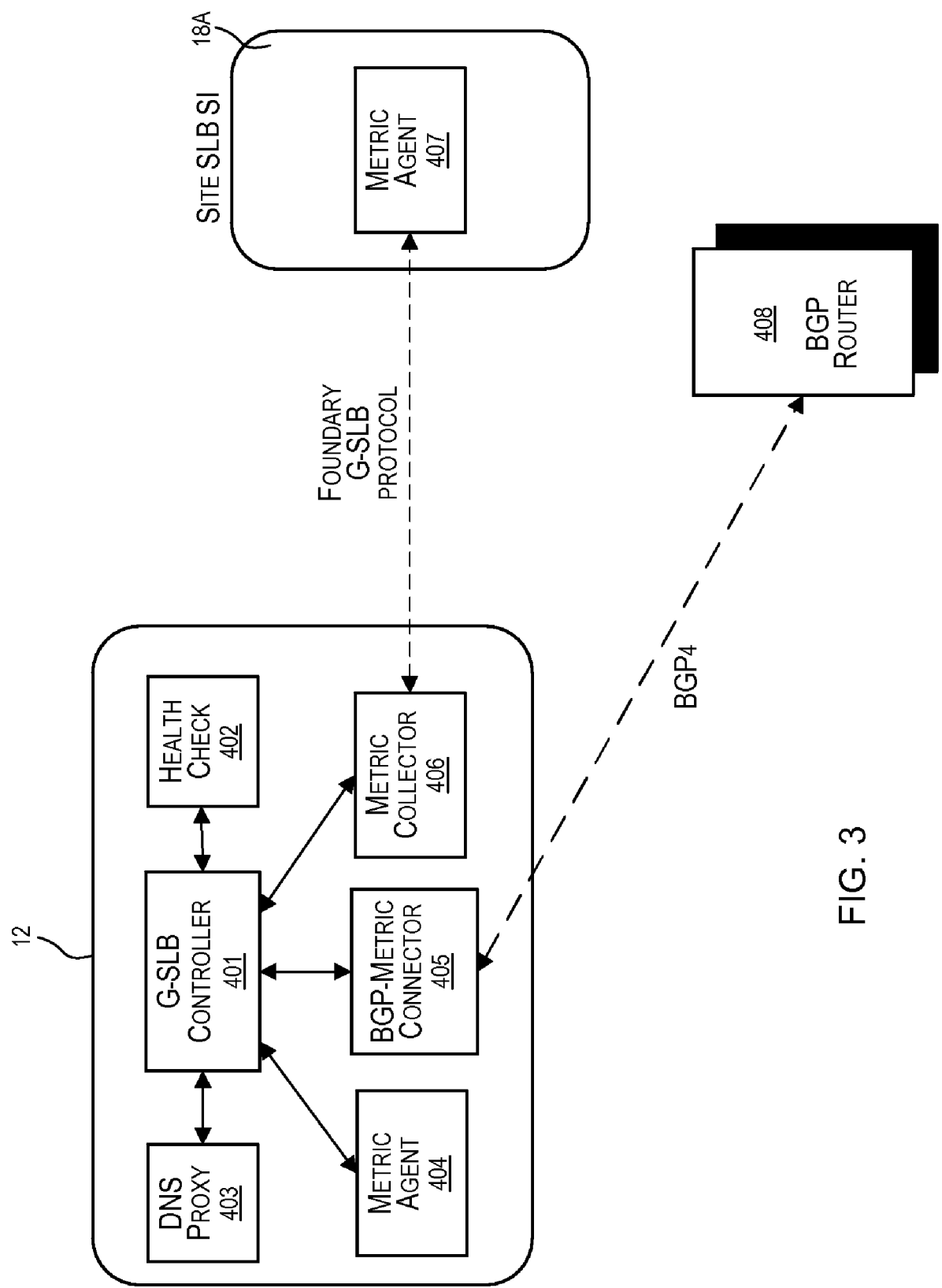
FIG. 3 is a block diagram showing the functional modules of GSLB switch 12 and site switch 18a relevant to the global server load balancing function.
Figure 3:
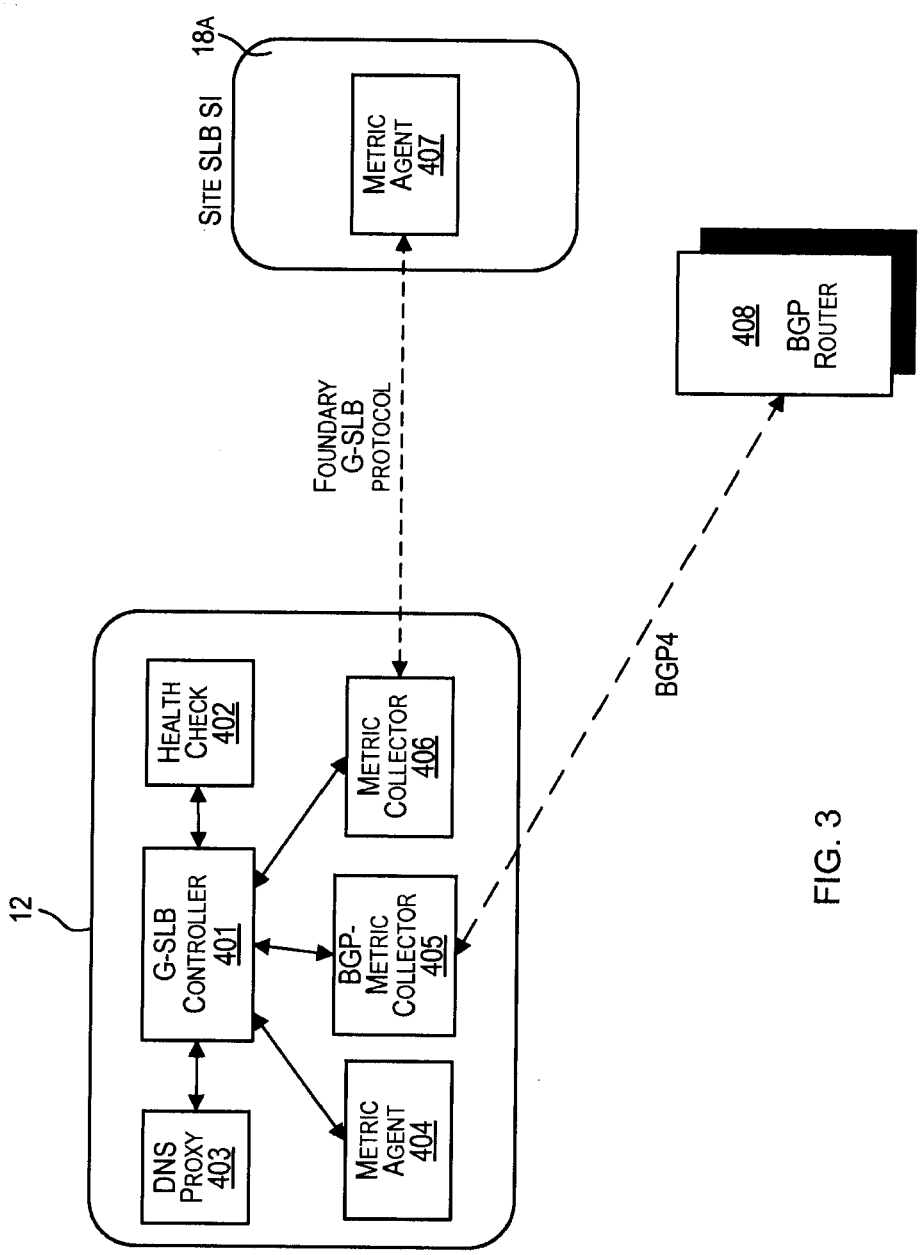

FIG. 3 is a block diagram showing the functional modules of GSLB switch 12 and site switch 18a relevant to the global server load balancing function. As shown in FIG. 3, GSLB 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (i.e., whether or not it is available) of each host server and each relevant application. Site-specific metric collector 406 communicates with metric agents in site-specific switches (e.g., FIG. 3 shows site-specific metric collector 406 communicating with site-specific metric agent 407) to collect site-specific metrics (e.g., number of available sessions on a specific host server). Similarly, routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to the present invention, using the metrics collected by routing-metric collector 405 and site specific collector 406, and values of any other relevant parameter, and (e) provides the ordered list of IP addresses to the requesting DNS server. Since GSLB switch 12 can also act as a site switch, GSLB switch 12 is provided site-specific metric agent 404 for collecting metrics for a site-specific metric collector.

In one embodiment, the metrics used in a GSLB switch includes (a) the health of each host server and selected applications, (b) each site switch's session capacity threshold, (c) the round trip time (RTT) between a site switch and a client in a previous access, (d) the geographical location of a host server, (e) the current available session capacity in each site switch, (f) the "flashback" speed between each site switch and the GSLB switch (i.e., how quickly each site switch responds to a health check from the GSLB switch), and (g) a policy called the "Least Response selection" (LRS) which prefers the site least selected previously. Many of these performance metrics can be provided default values. Each individual metric can be used in any order and each metric can be disabled. In one embodiment, the LRS metric is always enabled.

Figure 2:
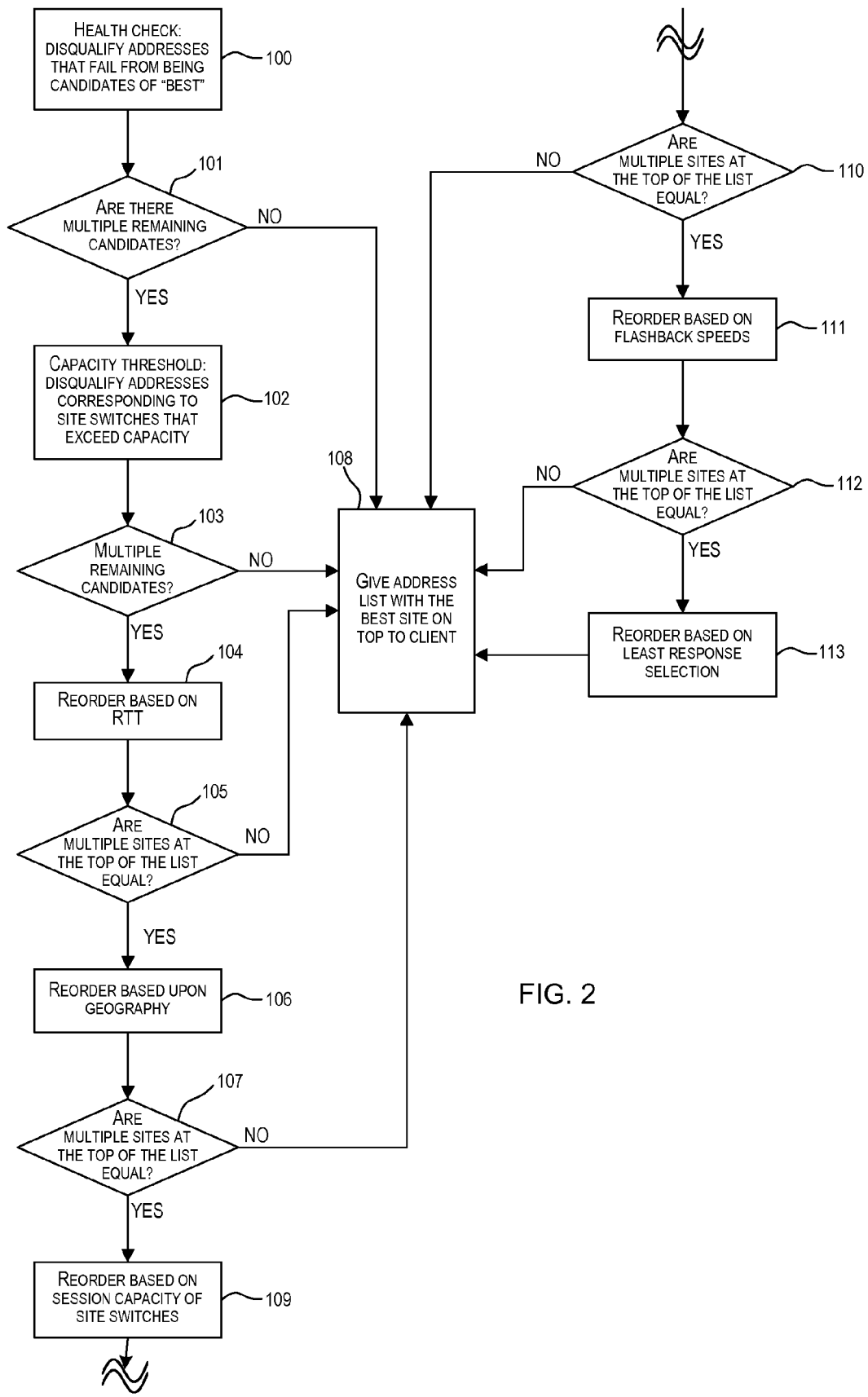
FIG. 2 illustrates in a flow chart one embodiment of the algorithm for selecting the "best" address from the list of addresses supplied by the authoritative DNS.

FIG. 2 illustrates in a flow diagram one embodiment of an optimization algorithm utilized by GSLB switch 12 to process the IP address list received from DNS server 16, in response to a query resulting from client program 28. As shown in FIG. 2, in act 100, upon receiving the IP address list from DNS server 16, GSLB switch 12 performs, for each IP address on the IP address list (e.g., host server 26I connected to site switch 18B), a layer 4 health check and a layer 7 check. Here, layers 4 and 7 refer respectively to the transport and application protocols in the Open System Interconnection (OSI) protocol layers. The layer 4 health check can be a Transmission Control Protocol (TCP) health check or a User Datagram Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP ACK packet is received back from the target. In this embodiment, the layer 7 health check is provided for specified applications, such as the well-known HyperText Transport Protocol (HTTP) and the File Transfer Protocol (FTP) applications. If a host server or an associated application fails any of the health checks it is disqualified (act 102) from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses consists of only one IP address (act 101), the list of IP addresses is returned to client program 28 at act 108.

After act 100, if the list of candidate IP addresses for the best site consists of multiple IP addresses, it is further assessed in act 102 based upon the capacity threshold of the site switch serving that IP address. Each site switch may have a different maximum number of TCP sessions it can serve. For example, the default number for the "ServerIron" product of Foundry Network is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.)

After act 102, if the list of IP addresses consists of only one IP address (act 103), the list of IP addresses is returned to client program 28 at list 108.

After act 102, if the IP address list consists of multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN ACK packet, to indicate acceptance of a TCP connection; the client machine returns a TCP ACK packet to complete the setting up of the TCP connection.) The GSLB Switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%. To prevent bias, the GSLB) switch ignores, by default, RTT values for 5% of client queries from each responding network. After act 105, if the top entries on the list of IP addresses do not have equal RTTs, the list of IP addresses is returned to client program 28 at act 108.

If multiple sites have equal RTTs then the list is reordered in act 106 based upon the location (geography) of the host server. The geographic location of a server is determined according to whether the IP address is a real address or a virtual IP address ("VIP"). For a real IP address the geographical region for the host server can be determined from the IP address itself. Under IANA, regional registries RIPE (Europe), APNIC (Asia/Pacific Rim) and ARIN (the Americas and Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB Switch prefers an IP address that is in the same geographical region as the client machine. At act 107, if the top two entries on the IP list are not equally ranked, the IP list is sent to the client program 28 at act 108.

After act 106, if multiple sites are of equal rank for the best site, the IP addresses can then be reordered based upon available session capacity (act 109). For example, if switch 18A has 1,000,000 sessions available and switch 22B has 800,000 sessions available, switch 18A is then be preferred, if a tolerance limit, representing the difference in sessions available expressed as a percentage of capacity in the larger switch, is exceeded. For example, if the tolerance limit is 10%, switch 18A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity does not resolve the best IP address, act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client's program uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure. The present invention does not prevent a site switch from performing load balancing among host servers within its subnetwork by redirection using a similar mechanism.

To provide an RTT under the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host sever specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of an IP address.) The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

While particular embodiments of the present invention have been shown and described it will be apparent to those skilled in the art that changes and modifications may be made without departing from this invention in its broader aspect and, therefore, the appended claims are to encompass within their scope all such changes and modifications.

What is claimed is:

1. A method of performing load balancing using a load balancing switch, the method comprising:

storing, at the load balancing switch, performance metrics regarding a plurality of site switches, each site switch associated with one or more host servers, wherein the one or more host servers associated with a site switch are reachable via the site switch using a virtual address configured at the site switch and wherein the performance metrics regarding a site switch comprise one or more metrics related to one or more host servers associated with the site switch;

storing, at the load balancing switch, a plurality of network addresses generated in response to a domain name query;

ordering the plurality of network addresses at the load balancing switch based upon a first set of performance metrics from the stored performance metrics to generate a first ordered list of network addresses;

determining if a single network address tops the first ordered list generated based upon the first set of performance metrics; and upon determining that a single network address does not top the first ordered list, reordering, at the load balancing switch, one or more network addresses from the plurality of network addresses based upon a second set of performance metrics from the stored performance metrics, wherein the second set of performance metrics is different from the first set of performance metrics.

2. The method of claim 1 wherein the ordering comprises:
determining at least one network address from the plurality of network addresses that fails a health check; and
excluding the at least one network address from the first ordered list of network addresses.

3. The method of claim 2 wherein the health check is a Open System Interconnection (OSI) layer 4 or layer 7 health check.

4. The method of claim 2 wherein the health check is a Transmission Control Protocol (TCP) or User Datagram Protocol (UDP) health check.

5. The method of claim 1 wherein the ordering or reordering comprises ordering the plurality of network addresses based upon, for each site switch in the plurality of site switches, a number of sessions supported by the site switch and a maximum number of sessions supportable by the site switch.

6. The method of claim 1 wherein storing the performance metrics comprises:
storing the performance metrics in a database stored by the load balancing switch.

7. The method of claim 1 wherein:
the stored performance metrics comprise round trip time information for each site switch in the plurality of site switches and a client machine sending the domain name query, wherein the round trip time information for a site switch is indicative of time for exchanging messages between the site switch and the client machine; and
the ordering or reordering comprises ordering the plurality of network addresses at the load balancing switch based upon the round trip time information included in the performance metrics.

8. The method of claim 1 wherein the ordering or reordering comprises ordering the plurality of network addresses based upon available session capacity associated with network addresses in the plurality of network addresses.

9. The method of claim 1 wherein the ordering or reordering comprises ordering the plurality of network addresses at the load balancing switch based upon a flashback speed associated with each site switch in the plurality of site switches, wherein a flashback speed for a site switch is indicative of a time required for the site switch to respond to a health check performed by the load balancing switch on the site switch.

10. The method of claim 1 wherein the ordering or reordering comprises ordering the plurality of network addresses based upon geographical locations of the host servers associated with the plurality of site switches.

11. The method of claim 1 wherein the ordering or reordering comprises placing a network address from the plurality of network addresses of a least recently selected host server for placement at a higher position in the first or second ordered list.

12. A method performed by a load balancing switch, the method comprising:
storing, at the load balancing switch, performance metrics for a first site switch and a second site switch, wherein the performance metrics for the first site switch comprise metrics related to one or more host servers associated with the first site switch and reachable via the first site switch and the performance metrics for the second site switch comprise metrics related to one or more host servers associated with the second site switch and reachable via the second site switch;

storing, at the load balancing switch, a plurality of network addresses generated in response to a domain name query; and ordering, at the load balancing switch, the plurality of network addresses one or more times based upon the stored performance metrics until an ordered list of network addresses is generated that has only one network address at the top of the ordered list;

wherein the ordering comprises ordering the plurality of network addresses using at least one of round trip time information associated with the first and second site switches, wherein the round trip time information associated with a site switch is indicative of time for exchanging messages between the site switch and a client machine generating the domain name query, available session capacity associated with network addresses in the plurality of network addresses, a flashback speed associated with the first site switch and the second site switch, wherein a flashback speed associated with a site switch is indicative of a time required for the site switch to respond to a health check performed by the load balancing switch on the site switch, geographical locations of the host servers associated with the first and second site switches, or previous selections of network addresses in the plurality of network addresses as the best network address in response to a domain name query.

13. A system for performing load balancing, the system comprising:
a load balancing switch configured to store performance metrics for a plurality of site switches, each site switch associated with one or more host servers, wherein the one or more host servers associated with a site switch are reachable via the site switch using a virtual address configured at the site switch, the stored performance metrics comprising one or more metrics related to the one or more host servers;

wherein the load balancing switch is further configured to:
store a plurality of network addresses generated in response to a domain name query;
order the plurality of network addresses based upon a first set of performance metrics from the stored performance metrics to generate a first ordered list of network addresses;
determine if a single network address tops the first ordered list generated based upon the first set of performance metrics; and reorder one or more network addresses from the plurality of network addresses based upon a second set of performance metrics from the stored performance metrics upon determining that a single network address does not top the first ordered list wherein the second set of performance metrics is different from the first set of performance metrics.

14. The system of claim 13 wherein the load balancing switch is configured to:
determine at least one network address from the plurality of network addresses that fails a health check; and
exclude the at least one network address from the first ordered list of network addresses.

15. The system of claim 14 wherein the health check is a Open System Interconnection (OSI) layer 4 or layer 7 health check.

16. The system of claim 14 wherein the health check is a Transmission Control Protocol (TCP) or User Datagram Protocol (UDP) health check.

17. The system of claim 13 wherein the load balancing switch is configured to order or reorder the plurality of network addresses based upon, for each site switch in the plurality of site switches, a number of sessions supported by the site switch and a maximum number of sessions supportable by the site switch.

18. The system of claim 13 wherein the load balancing switch is configured to:
store the performance metrics in a database.

19. The system of claim 13 wherein:
the performance metrics comprise round trip time information for each site switch in the plurality of site switches and a client machine sending the domain name query, wherein the round trip time information for a site switch is indicative of time for exchanging messages between the site switch and the client machine; and
the load balancing switch is configured to order or reorder the plurality of network addresses based upon the round trip time information included in the performance metrics.

20. The system of claim 13 wherein the load balancing switch is configured to order or reorder the plurality of network addresses based upon available session capacity associated with network addresses in the plurality of network addresses.

21. The system of claim 13 wherein the load balancing switch is configured to order or reorder the plurality of network addresses based upon a flashback speed associated with each site switch in the plurality of site switches, wherein a flashback speed for a site switch is indicative of a time required for the site switch to respond to a health check performed by the load balancing server on the site switch.

22. The system of claim 13 wherein the load balancing switch is configured to order or reorder the plurality of network addresses based upon geographical locations of the host servers associated with the plurality of site switches.

23. The system of claim 13 wherein the load balancing switch is configured to order or reorder the plurality of network addresses by placing a network address from the plurality of network addresses of a least recently selected host server for placement at a higher position in the first or second ordered list.

24. A system for performing load balancing, the system comprising:
a load balancing switch adapted to
store performance metrics for a first site switch and a second site switch, wherein the performance metrics for the first site switch comprise metrics related to one or more host servers associated with the first site switch and reachable via the first site switch and the performance metrics for the second site switch comprise metrics related to one or more host servers associated with the second site switch and reachable via the second site switch,
store a plurality of network addresses generated in response to a domain name query, and
order the plurality of network addresses one or more times based upon the stored performance metrics until an ordered list of network addresses is generated that has only one network address at the top of the ordered list;
wherein the load balancing switch is adapted to order the plurality of network addresses using at least one of
round trip time information associated with the first and second site switches, wherein the round trip time information associated with a site switch is indicative of time for exchanging messages between the site switch and a client machine generating the domain name query,
available session capacity associated with network addresses in the plurality of network addresses,
a flashback speed associated with the first site switch and the second site switch, wherein a flashback speed associated with a site switch is indicative of a time required for the site switch to respond to a health check performed by the load balancing switch on the site switch,
geographical locations of the host servers associated with the first and second site switches, or
previous selections of network addresses in the plurality of network addresses as the best network address in response to a domain name query.

25. A computer-readable storage medium storing a plurality of instructions for controlling a processor to perform load balancing, the plurality of instructions comprising:
instructions that cause the processor to store performance metrics regarding a plurality of site switches, each site switch associated with one or more host servers, wherein the one or more host servers associated with a site switch are reachable via the site switch using a virtual address configured at the site switch and wherein the performance metrics regarding a site switch comprise one or more metrics related to one or more host servers associated with the site switch;
instructions that cause the processor to store a plurality of network addresses generated in response to a domain name query;
instructions that cause the processor to order the plurality of network addresses based upon a first set of performance metrics from the stored performance metrics to generate a first ordered list of network addresses;
instructions that cause the processor to determine if a single network address tops the first ordered list generated based upon the first set of performance metrics; and
instructions that cause the processor to reorder one or more network addresses from the plurality of network addresses based upon a second set of performance metrics from the stored performance metrics upon determining that a single network address does not top the first ordered list, wherein the second set of performance metrics is different from the first set of performance metrics.

26. A method performed by a load balancing switch, the method comprising:
performing, at the load balancing switch, a first ordering of a plurality of network addresses based upon a first set of performance metrics for a set of servers, the plurality of network addresses generated in response to a domain name query; and performing, based upon a result of the first ordering, a second ordering of the plurality of network addresses based upon a second set of performance metrics for the set of servers;

wherein the second set of performance metrics is different from the first set of performance metrics, wherein the first set of performance metrics comprises one of:

round trip time information associated with a plurality of site switches associated with one or more servers from the set of servers, wherein the round trip time information associated with a site switch is indicative of time for exchanging messages between the site switch and a client machine generating the domain name query;

available session capacity associated with network addresses in the plurality of network addresses;

a flashback speed associated with each of the plurality of site switches, wherein a flashback speed associated with a site switch is indicative of a time required for the site switch to respond to a health check performed by the load balancing switch on the site switch;

geographical locations of the set of servers; or previous selections of network addresses in the plurality of network addresses as the best network address in response to a domain name query.

27. The method of claim 26 wherein the one or more host servers associated with a site switch are reachable via the site switch using a virtual address configured at the site switch.

28. The method of claim 26 wherein the second ordering is performed upon determining that the first ordering does not yield a single network address as a best candidate from the plurality of network addresses.

* * * * *

UNITED STATES PATENT AND TRADEMARK OFFICE
CERTIFICATE OF CORRECTION

PATENT NO. : 7,581,009 B1  Page 1 of 2
APPLICATION NO. : 11/741480
DATED : August 25, 2009
INVENTOR(S) : Ivy Pei-Shan Hsu, David Chun Ying Cheung and Rajkumar Ramniranjan Jalan It is certified that error appears in the above-identified patent and that said Letters Patent is hereby corrected as shown below:

In the References Cited (56) under "Other Publications":

On page 3, please delete "International Business Machines Corporation, "IBM WebSphere Performance Pack: Load Balancing with IBM SecureWay Network Dispatcher," Oct. 1999, First edition, Chapter 1, "IBM WebSphere Performance Pack Concepts," (pp. 3-26), Chapter 2, "IBM SecureWay Network Dispatcher Concepts," (pp. 27-54), Chapter 4, "ND Basic Scenarios," (pp. 81-192), Chapter 8, "Wide Area Network Dispatcher Support," (pp. 211-242), downloaded from the Internet at http://www-3.ibm.com/software/webservers/edgeserver/library.html"
and insert -- International Business Machines Corporation, "IBM WebSphere Performance Pack: Load Balancing with IBM SecureWay Network Dispatcher," Oct. 1999, First edition, Chapter 1, "IBM WebSphere Performance Pack Concepts," (pp. 3-26), Chapter 2, "IBM SecureWay Network Dispatcher Concepts," (pp. 27-54), Chapter 4, "ND Basic Scenarios," (pp. 81-162), Chapter 8, "Wide Area Network Dispatcher Support," (pp. 211-242), downloaded from the Internet at http://www-3.ibm.com/software/webservers/edgeserver/library.html --.

On page 3, please delete "Norton Networks, "Alteon Personal Content Director," © 2001, can be retrieved from http://www.nortelnetworks.com/personalinternet, 4 pages"
and insert -- Nortel Networks, "Alteon Personal Content Director," © 2001, can be retrieved from http://www.nortelnetworks.com/personalinternet, 4 pages --.

In the Drawings, please replace Drawing sheet 3 with the attached replacement one (1) sheet of drawing, showing replacement Figure 3 on the attached page.

In the Claims:

Claim 13, at column 9, line 5 please delete "list wherein" and insert -- list, wherein --.

Signed and Sealed this

Sixteenth Day of March, 2010

David J. Kappos
*Director of the United States Patent and Trademark Office*

(12) EX PARTE REEXAMINATION CERTIFICATE (9294th)
United States Patent
Hsu et al.

(10) Number: US 7,581,009 C1
(45) Certificate Issued: *Sep. 11, 2012

(54) GLOBAL SERVER LOAD BALANCING

(75) Inventors: Ivy Pei-Shan Hsu, Pleasanton, CA (US); David Chun-Ying Cheung, Cupertino, CA (US); Rajkumar Ramniranjan Jalan, Saratoga, CA (US)

(73) Assignee: Brocade Communications Systems, Inc., San Jose, CA (US)

Reexamination Request:
No. 90/011,770, Jun. 27, 2011

Reexamination Certificate for:
Patent No.: 7,581,009
Issued: Aug. 25, 2009
Appl. No.: 11/741,480
Filed: Apr. 27, 2007

(*) Notice: This patent is subject to a terminal disclaimer.

Certificate of Correction issued Mar. 16, 2010.

Related U.S. Application Data

(63) Continuation of application No. 09/670,487, filed on Sep. 26, 2000, now Pat. No. 7,454,500.

(51) Int. Cl.
*G06F 15/173* (2006.01)

(52) U.S. Cl. .............. 709/226; 709/201; 709/203; 709/223; 709/224; 709/241

(58) Field of Classification Search .............. None
See application file for complete search history.

(56) References Cited

To view the complete listing of prior art documents cited during the proceeding for Reexamination Control Number 90/011,770, please refer to the USPTO's public Patent Application Information Retrieval (PAIR) system under the Display References tab.

*Primary Examiner* — Joshua Campbell

(57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

At the time of issuance and publication of this certificate, the patent remains subject to pending reexamination control number 95/001,807 filed Nov. 4, 2011. The claim content of the patent may be subsequently revised if a reexamination certificate issues from the reexamination proceeding.

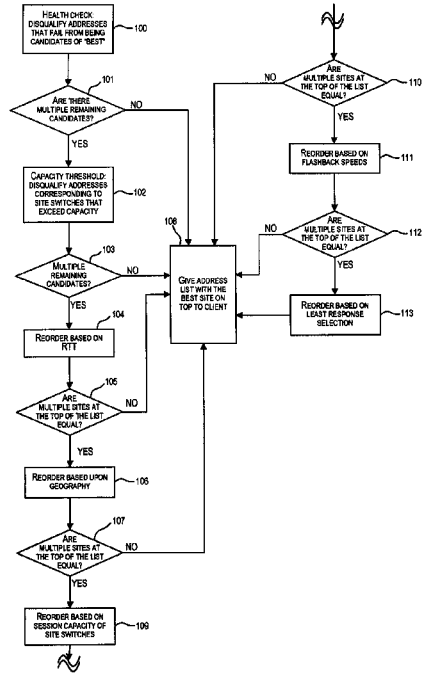

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 12, 13 and 24-26 is confirmed.

Claims 2-11, 14-23, 27 and 28 were not reexamined.

* * * * *

(12) INTER PARTES REEXAMINATION CERTIFICATE (1177th)
United States Patent
Hsu et al.

(10) Number: US 7,581,009 C2
(45) Certificate Issued: *Sep. 22, 2015

(54) GLOBAL SERVER LOAD BALANCING

(75) Inventors: Ivy Pei-Shan Hsu, Pleasanton, CA (US); David Chun-Ying Cheung, Cupertino, CA (US); Rajkumar Ramniranjan Jalan, Saratoga, CA (US)

(73) Assignee: BROCADE COMMUNICATIONS SYSTEMS, INC., San Jose, CA (US)

Reexamination Request:
No. 95/001,807, Nov. 4, 2011

Reexamination Certificate for:
Patent No.: 7,581,009
Issued: Aug. 25, 2009
Appl. No.: 11/741,480
Filed: Apr. 27, 2007

Reexamination Certificate C1 7,581,009 issued Sep. 11, 2012

Certificate of Correction issued Mar. 16, 2010

( * ) Notice: This patent is subject to a terminal disclaimer.

Related U.S. Application Data

(63) Continuation of application No. 09/670,487, filed on Sep. 26, 2000, now Pat. No. 7,454,500.

(51) Int. Cl.
*G06F 15/173* (2006.01)
*H04L 29/08* (2006.01)

(52) U.S. Cl.
CPC ........ *H04L 67/1008* (2013.01); *H04L 67/1002* (2013.01); *H04L 67/1021* (2013.01); *H04L 29/08144* (2013.01); *H04L 67/1012* (2013.01)

(58) Field of Classification Search
None
See application file for complete search history.

(56) References Cited

To view the complete listing of prior art documents cited during the proceeding for Reexamination Control Number 95/001,807, please refer to the USPTO's public Patent Application Information Retrieval (PAIR) system under the Display References tab.

*Primary Examiner* — William H Wood

(57) ABSTRACT

A global server load balancing (GSLB) switch serves as a proxy to an authoritative DNS communicates with numerous site switches which are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

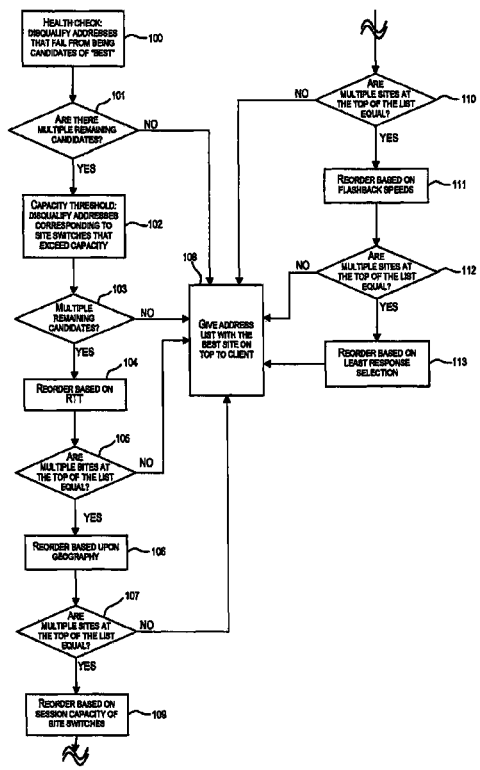

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 1-25 and 27 is confirmed.

Claims 26 and 28 are cancelled.

\* \* \* \* \*